(12) United States Patent
Kurpinski et al.

(10) Patent No.: US 7,683,764 B2
(45) Date of Patent: Mar. 23, 2010

(54) AUTOMATIC LOCKING FAILSAFE FOR VEHICLES WITH PASSIVE KEYS

(75) Inventors: Christopher M. Kurpinski, Berkley, MI (US); Thomas J. Keeling, Plymouth, MI (US); Justin P. McBride, West Bloomfield, MI (US); Toshihiro T. Wakamatsu, West Bloomfield, MI (US); Michael A. Wiegand, Birmingham, MI (US)

(73) Assignee: DENSO International America, Inc., Southfield, MI (US)

( * ) Notice: Subject to any disclaimer, the term of this patent is extended or adjusted under 35 U.S.C. 154(b) by 343 days.

(21) Appl. No.: 11/689,838

(22) Filed: Mar. 22, 2007

(65) Prior Publication Data

US 2008/0231417 A1 Sep. 25, 2008

(51) Int. Cl.
*B60R 25/10* (2006.01)
(52) U.S. Cl. .............. 340/426.36; 307/10.2; 340/5.72; 340/426.13; 340/426.28; 340/825.72
(58) Field of Classification Search . 340/426.1–426.36, 340/457, 5.1–5.2, 5.72, 825.31, 825–69, 340/825.72, 10.1–10.2
See application file for complete search history.

(56) References Cited

U.S. PATENT DOCUMENTS

| | | | | |
|---|---|---|---|---|
| 5,204,672 | A | * | 4/1993 | Brooks ................. 340/825.71 |
| 5,600,302 | A | * | 2/1997 | Lewis ........................ 340/457 |
| 6,396,412 | B1 | * | 5/2002 | Banas ........................ 340/5.2 |
| 6,476,517 | B1 | | 11/2002 | Okada |
| 6,570,486 | B1 | | 5/2003 | Simon et al. |
| 6,778,065 | B1 | | 8/2004 | Asakura et al. |
| 6,853,296 | B2 | | 2/2005 | Chandebois |
| 6,861,768 | B2 | * | 3/2005 | Willats et al. .............. 307/10.2 |
| 6,963,268 | B2 | | 11/2005 | Brillon |
| 6,998,967 | B2 | | 2/2006 | Brillon et al. |
| 2006/0279401 | A1 | | 12/2006 | Yoshii et al. |

* cited by examiner

*Primary Examiner*—Brent Swarthout
(74) *Attorney, Agent, or Firm*—Harness, Dickey & Pierce, PLC

(57) ABSTRACT

A method of unlocking a vehicle, which includes initiating an auto-lock command, searching an area surrounding the vehicle for a valid key fob, and sending a normal request from interior antenna if a valid key fob is not found. The method further includes sending a wide area request from an interior antenna if the valid key fob is not found from the normal request. The method includes locking the doors if the valid key fob is not found. The method provides a warning and does not lock the doors if the valid key fob is found.

14 Claims, 3 Drawing Sheets

AUTOMATIC LOCKING FAILSAFE FOR VEHICLES WITH PASSIVE KEYS

INTRODUCTION

Traditional vehicle access technology typically includes a lock for which a metal key is needed to lock or unlock a vehicle. Current conventional vehicle access technology allows locking or unlocking one or more doors from a remote location. For example, a user may unlock a lock using a remote access device such as a key fob. A key fob is a device that includes an authentication mechanism to control access to the vehicle. Alternatively, a vehicle access device may be integrated into a vehicle key and an access card, or integrated into another device such as a mobile phone or a PDA.

Passive vehicle access technology allows locking or unlocking one or more vehicle doors without pressing a button on a key fob. For example, a passive vehicle access system may require an exiting user to pause to lock a door, such as a driver's door, upon exiting the vehicle. This pause may consist of a user having to touch a button on a vehicle door handle to initiate a lock. In another example, a passive vehicle access system may use a sensing system to determine if a key fob is outside of the vehicle when the door is closed and then locks the vehicle. In the alternative, the vehicle can be unlocked when the sensor identifies a valid key fob near the door to be used to access the vehicle. With the use of passive vehicle access system, drivers may not pay close attention to the location of their key fob and mistakenly leave it in the vehicle, in an area in which it is undetectable, when exiting. This may activate the locking system and leave the driver locked out of the vehicle. Hence, there is a need that exists to improve passive vehicle access systems.

SUMMARY

Accordingly, applicants' teachings provide methods, apparatus, and systems for use in passive vehicle access systems. Some embodiments provide a method of unlocking a vehicle, which includes initiating an auto-lock command, searching an area surrounding the vehicle for a valid key fob, and sending a normal request from interior antenna if a valid key fob is not found. The method further includes sending a wide area request from an interior antenna if the valid key fob is not found from the normal request. The method includes locking the door if the valid key fob is not found, but also providing a warning and not locking the door if the valid key fob is found.

In some embodiments, applicants' teachings provide a vehicle door lock warning system for a vehicle having a keyless entry. The warning system may include a key fob in communication with the vehicle, a first antenna on-board the vehicle that may broadcast a low frequency to locate the key fob, and a second antenna mounted on-board the vehicle to broadcast a radio frequency to locate the key fob. The system also may include a door locking system and a controller in communication with the door locking system, the first antenna, the second antenna, and the key fob such that the controller commands the door locking system to lock if a valid key fob is not identified. Furthermore, the method may be such that the controller does not command the door locking system to lock the doors if the key fob is located. Moreover, the method can further comprise a warning system in communication with the controller such that the controller activates the door lock warning system if the key fob is located.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way. The present teachings will become more fully understood from the detailed description and the accompanying drawings wherein.

DETAILED DESCRIPTION

Figure 1:
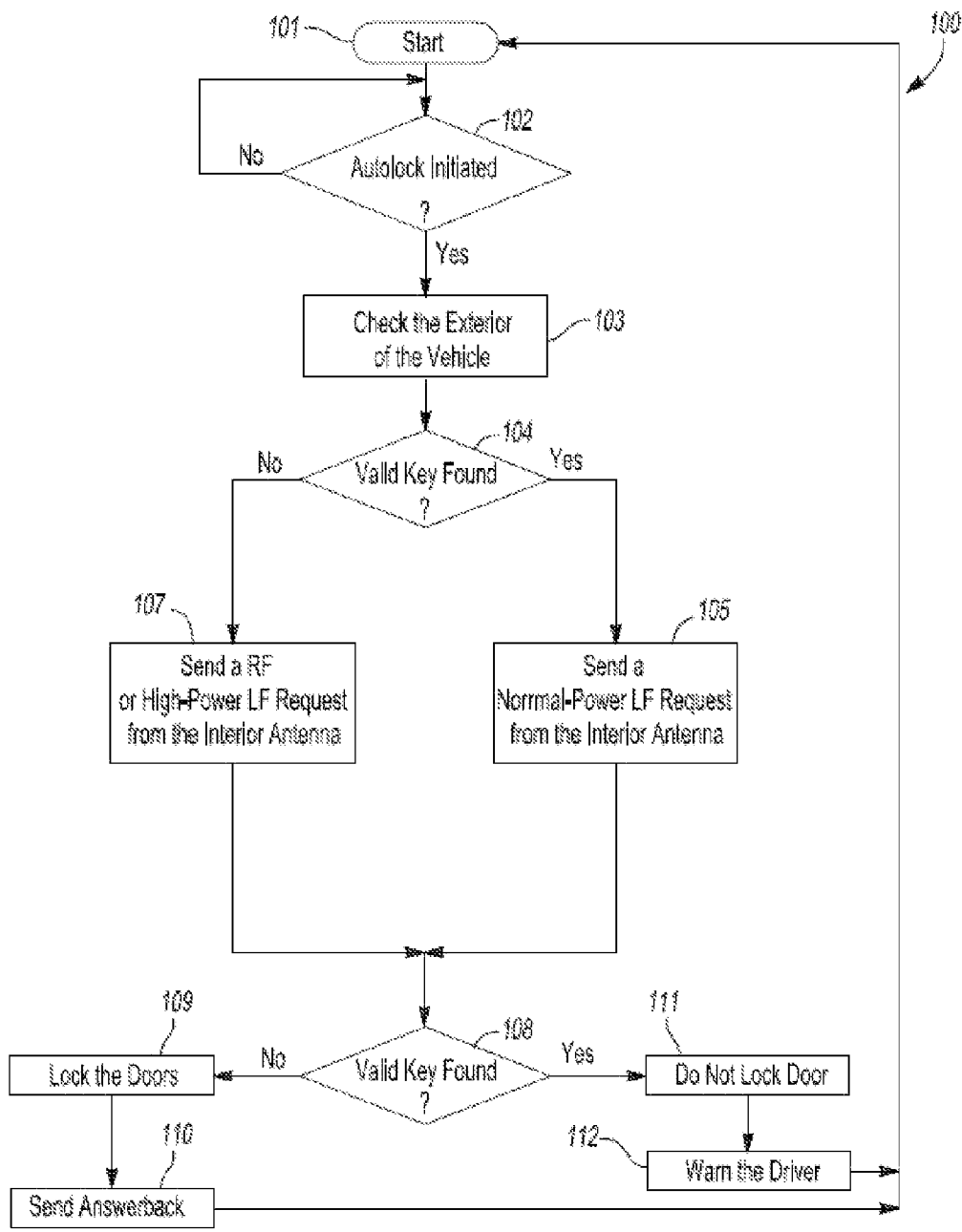
FIG. 1 is a flow chart that depicts a logic routine for a passive vehicle access system according to some embodiments of the present teachings.

The following description is merely exemplary in nature and is not intended to limit the present teachings, applications, or uses. It should be understood that throughout the drawings, corresponding reference numerals indicate like or corresponding parts and features. The description of specific examples indicated in some embodiments of the present teachings are intended for purposes of illustration only and are not intended to limit the scope of the teachings disclosed herein. Moreover, recitation of multiple embodiments having stated features is not intended to exclude other embodiments having additional features or other embodiments incorporating different combinations of the stated features.

The citation of references herein does not constitute admission that those references are prior art or have relevance to the patentability of the teachings disclosed herein. All references cited in the Detailed Description section of the specification are hereby incorporated by reference in their entirety for all purposes. In the event that one or more of the incorporated references, literature, and similar materials differs from or contradicts this application, including, but not limited to, defined terms, term usage, described techniques, or the like, this application controls.

In some embodiments, a vehicle can have a plurality of sensors and antennas at various locations, all in communication with a controller, such as a smart ECU. More specifically, a vehicle may employ a smart ECU used in conjunction with various antennas, such as a driver door antenna, a driver side rear door antenna, a passenger front door antenna, a passenger side rear door antenna, a trunk area antenna, and an interior antenna. The smart ECU, used in conjunction with the antennas, is used to place particular vehicle doors into a standby mode prior to unlocking by a user (a driver). An interior antenna is used to check for any keys, such as a smart key, an electronic key, a key fob, and the like, that may be left in the interior of the vehicle during a locking routine.

The smart ECU can be referred to as "smart" because of its intelligent function of knowing when to unlock the vehicle doors without the use of a traditional, metal key. The smart ECU may be in communication with a door unlocking system. One type of a smart key system, such as a polling system, is based upon the proximity of a key fob to an antenna and permits a user to approach a vehicle with a key fob to accomplish unlocking of a door simply by communication of the key fob with the smart ECU.

The unlock standby mode is activated without human manipulation of any buttons on a key fob. To accomplish automatic door locking or unlocking, the user simply possesses a key fob, which may also be known as a transponder or electronic key that emits a frequency response to at least one of the antennas when the user approaches the vehicle. The frequency can be a specific radio frequency that is in communication with the antenna on-board the vehicle. Subsequent to such communication, when the user, for example, touches a sensor on the door with respect to the door lock, that respective door lock will unlock. The user may then pull on the respective door handle to complete the opening of the door to gain access to the vehicle.

Unlocking the vehicle door locks can be accomplished in another process. For example, in a passive vehicle access system, before a user approaches a vehicle (i.e., when the user is outside of communication access range of the smart ECU), the smart ECU causes a specific radio signal to be emitted in a polling fashion from the various antennas located within and about the vehicle. The signal is pulsed at a specific time integral but may be pulsed in a polling fashion taking into consideration all on-board antennas. The communication radius may be about 3 to about 4 feet as an example but may be determined by the manufacturer.

When the key fob is within the communication radius of an antenna, the key fob may transmit a unique security code to the smart ECU. When the smart ECU recognizes the unique security code, the door locks of the vehicle are placed into unlock standby mode. When in the unlock standby mode, the handle may be touched to activate a contact sensor which unlocks the door to allow access to the vehicle.

Alternatively, when locking a door of a vehicle, the user has possession of a smart key or a key fob when exiting the vehicle and closes all vehicle doors. The user remains standing within the transmitting range of an antenna which may be located within a vehicle door. The key fob is communicating with the signal of the antenna which is governed by a smart ECU. With the user in this position, because the key fob and the smart ECU are able to communicate, the doors are not locked. When the user walks away from the vehicle and becomes out of range or out of zone of the polling signal transmitted by the antenna, the doors of the vehicle lock. In some embodiments, the smart ECU may use a timer to lock the doors of a vehicle. In such embodiments, a timer begins after the user exits and the doors are closed. Smart ECU sends a command to lock the doors when the timer expires. The timer can be useful to prevent a battery from being drained by the polling signal continuously transmitted by the antenna.

Figure 3:
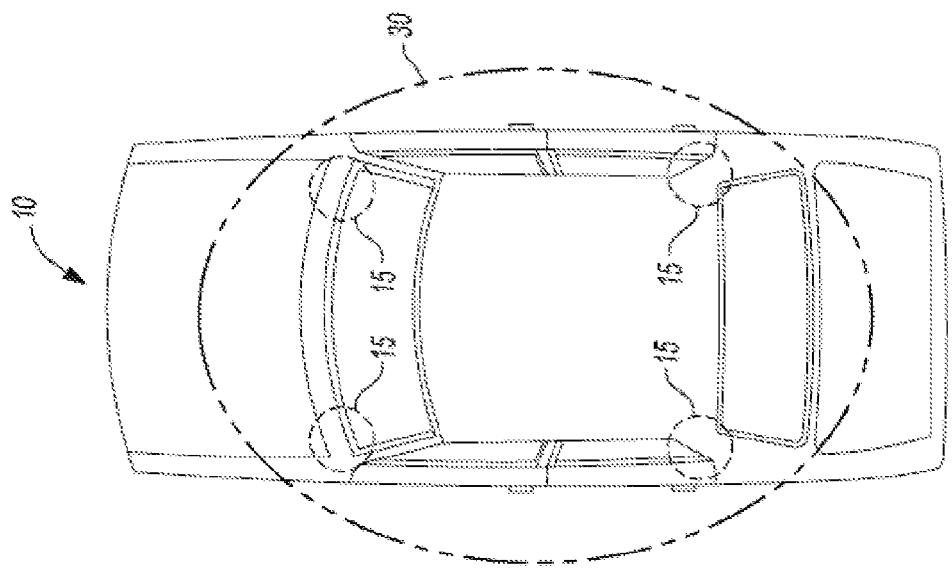
FIG. 3 is a top view of a vehicle depicting a wide area field for locating a key fob according to some embodiments of the present teachings.
Figure 2:
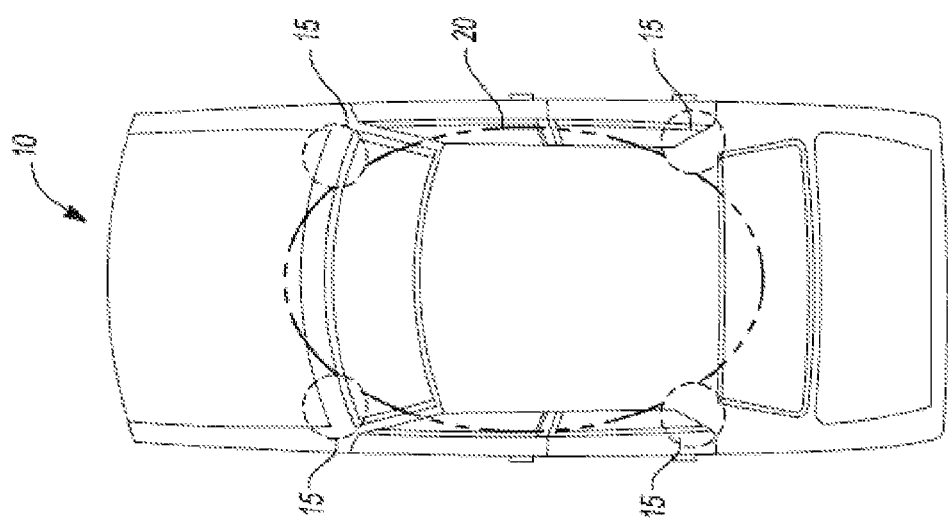
FIG. 2 is a top view of a vehicle depicting a normal field for locating a first key fob according to some embodiments of the present teachings.

With general reference to FIGS. 1-3, but more specifically with reference to FIG. 2, in some embodiments, a passive vehicle access system having a smart ECU in communication with an interior antenna located in vehicle 10 performs an interior check for any key fobs before the automatic door locking to determine if a key fob is inside vehicle 10. The user exits vehicle 10 and the smart ECU performs an interior check, which includes an internal antenna broadcasting a normal field 20. Typically, normal field 20 is confined to the interior of vehicle 10 and can be a low frequency broadcast. This interior check looks for key fobs before an automatic door locking is activated. This interior check using normal field 20 leaves dead zones 15 within the interior of vehicle 10. A key fob may be located in a dead zone 15 and not be located by normal field 20; thus, the vehicle 10 may be locked with the key fob still inside the vehicle 10. With reference to FIG. 3, a subsequent wide area field 30 may be broadcast by an interior antenna using a high powered low frequency or a radio frequency. The wide area field 30 includes dead zone 15 and confirms that a key fob will not be locked in vehicle 10.

In the event that any key fobs are detected, the smart ECU will cause notification of an alarm to alert the user that at least one key fob remains in vehicle 10. Such notification will occur before the user leaves the immediate area of the vehicle 10. The notification may consist of an audible alarm, such as a voice warning, a siren, a horn, a ringtone, and a music clip. The notification may consist of a visual alarm, such as flashing headlights, flashing interior lights, flashing side markers, a flashing light on the key fob, or a text message on the key fob. In some embodiments, the alarm may include both an audible alarm and a visual alarm. Moreover, the key fob that the user is carrying may sound an alarm or vibrate to alert the user that an additional key fob has been left in vehicle 10. In some embodiments, the alarm may be communicated to a device, such as a cell phone or a PDA. Turning now to FIG. 1, a flow chart depicting a routine 100 for locating a key fob inside of a vehicle 10 is presented. The routine 100 from start step 101 proceeds to step 102 where a smart ECU determines if an auto-lock has been initiated. If the decision is "no," the routine 100 returns to step 101; however, if the decision is "yes," the routine 100 proceeds to step 103 where the smart ECU checks the exterior area immediately next to vehicle 10. For example, this exterior area can be an area within approximately 4 feet of each of the vehicle doors.

The routine 100 then proceeds to step 104 where the smart ECU determines if a valid key fob is found. If the decision is "yes", the routine 100 proceeds to step 105. In step 105, the smart ECU signals the interior antenna to broadcast normal field 20 to check the interior for a key fob in step 105 and the routine 100 proceeds to step 108. If the decision is "no," the routine 100 proceeds to step 107. In step 107, the smart ECU sends wide area field 30 which may be a high powered, low frequency field or a radio frequency field to check the interior of the vehicle 10 for a key fob and the routine 100 proceeds to step 108. In step 108, the smart ECU determines if a valid key fob has been found. If the decision is "no," the routine 100 proceeds to step 109 and locks the doors. The routine 100 proceeds to step 110 and provides an answerback to the user. If it is determined that a valid key fob has been found in step 108, the routine 100 proceeds to step 111, and the smart ECU stops the auto-lock initiation and does not lock the door. The routine 100 proceeds to step 112 and sends a warning to the user.

Figure 4:
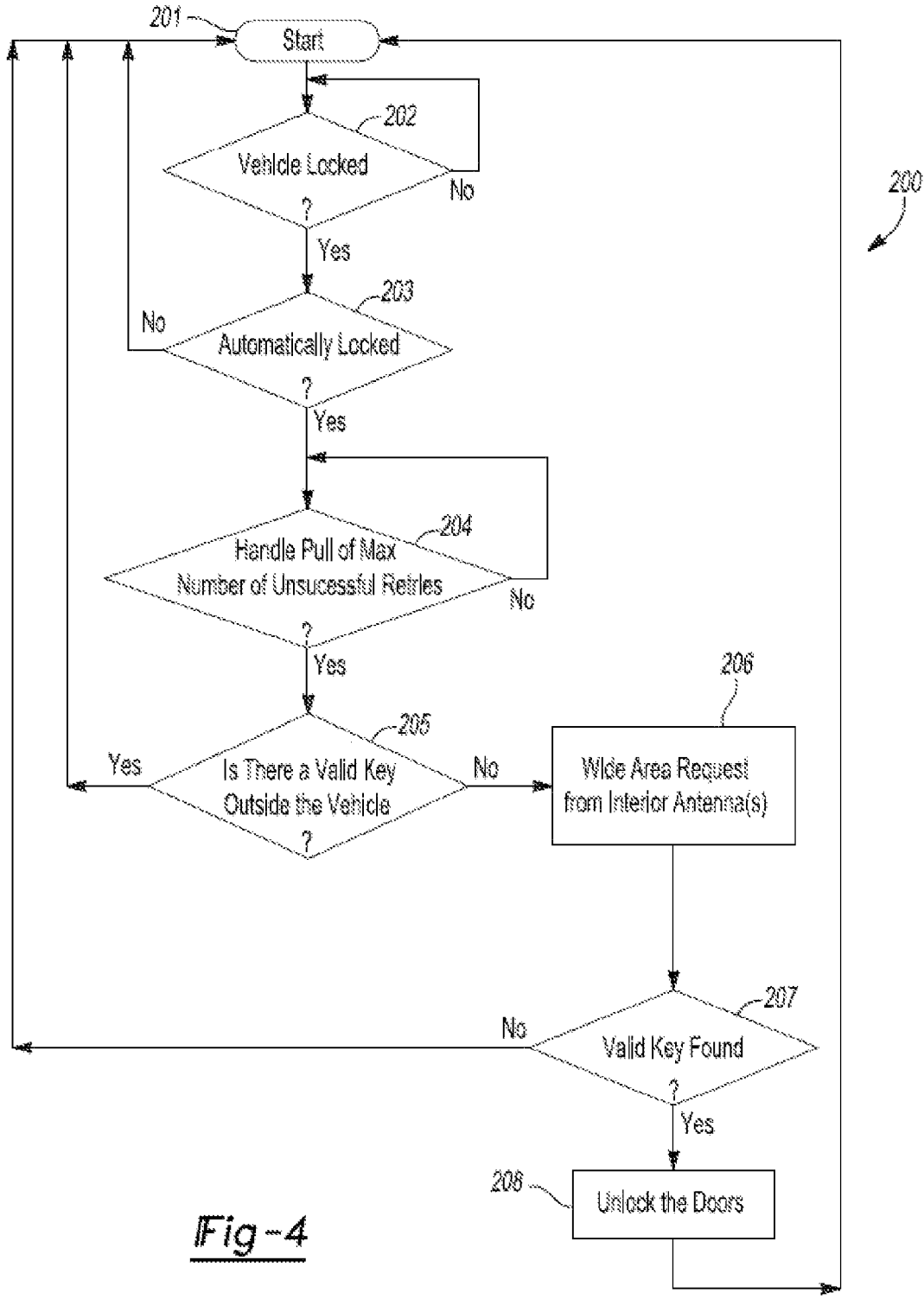
FIG. 4 is a second flowchart that depicts a logic routine for a passive vehicle access system according to some embodiments of the present teachings.

In some embodiments, the present teachings provide a method of entering a locked vehicle having a passive vehicle access system, which has a key fob locked in the vehicle 10. With reference to FIG. 4, a flow chart of an entry routine 200 is depicted. Such a routine 200 begins at step 201 and proceeds to step 202, which inquires as to whether the vehicle 10 is locked. If the vehicle 10 is not locked, the routine 200 returns to step 201. If the vehicle 10 is locked, the routine 200 proceeds to step 203 where the smart ECU determines whether the vehicle 10 was locked using an auto-lock command from the smart ECU. If the decision is "no," the routine 200 returns to step 201; however, if the decision is "yes," the routine 200 proceeds to step 204 where the user may pull a handle of a door a preset number of times in step 204. Upon reaching the preset number of pulls (or failed attempts to enter), the routine 200 proceeds to step 205. In step 205, the smart ECU determines if there is a valid key fob outside of the vehicle 10 by checking its exterior area immediately next to the vehicle 10. For example, this exterior area can be of about 3 to about 4 feet around each of the doors. If a key fob is located in the exterior area of the vehicle 10, the routine 200 returns to step 201. If a key fob is not located in the exterior area of the vehicle 10, the routine 200 proceeds to step 206. In step 206, the smart ECU provides a wide area request, which can be wide area field 30, such as a high powered, low frequency field broadcast by a group of interior antennas or a radio frequency field broadcast by an interior antenna to locate any valid key fob that has been left in the interior of the vehicle 10. The routine 200 proceeds to step 207 to determine if a key fob has been located in the interior of the vehicle 10. If a valid key fob is not found in step 207, the routine 200 returns to step 201. If a valid key fob is found, the routine 200 proceeds to step 208 where the smart ECU unlocks the door of the vehicle 10.

The advantages and benefits of the present teachings include the use of a wide area field 30, such as a high powered radio frequency or a high powered, low frequency field to locate a key fob before an auto-lock is performed. If the key fob is located, the user can be notified that the key fob is inside the vehicle 10 and the auto-lock will be cancelled. This has the benefit of alerting the user if the user has forgotten the key fob, which remains inside the vehicle 10, and prevents the user from being stranded outside of the vehicle 10. The methods of the present teachings may be disabled when the vehicle 10 is not locked automatically such as, for example, being locked with a lock switch, a button on the key fob, or other manual locking methods. The disabling of the method provides the added benefit that the user can sit with a valid key fob inside a locked vehicle 10 and remain secure. In some embodiments, an occupant sensor, such as a seat sensor, heart beat sensor, infrared sensor, a camera, or the like, can be used to disable a method of the present teachings. In some embodiments, when the key fob battery is sensed to be low, the auto-lock is disabled. This prevents the key fob from being locked inside the vehicle 10 and from not being located because the key fob has a dead battery. A warning, such as, for example, an audible alarm as described herein, can be given to the user to inform the user that the auto-lock has been disabled and the vehicle 10 will not automatically secure itself. In addition, a warning can also be given to the user to inform the user that the key fob battery needs to be replaced.

Some embodiments and the examples described herein are exemplary and not intended to be limiting in describing the full scope of compositions and methods of these teachings. Equivalent changes, modifications and variations of some embodiments, materials, compositions, and methods can be made within the scope of the present teachings with substantially similar results.

What is claimed is:

1. A method of controlling a locking system for a door of a vehicle, the method comprising:
   initiating an auto-lock command with a control unit in the vehicle;
   searching an area surrounding the vehicle for a valid key fob by employing the control unit to transmit a signal outside the vehicle;
   sending a normal request from an interior antenna within an interior of the vehicle, the normal request covering less than all of the interior of the vehicle, if the valid key fob is found outside the vehicle;
   sending a wide area request from the interior antenna to the interior of the vehicle, the wide area request covering all of the interior of the vehicle, if the valid key fob is not found within the interior of the vehicle by the normal request;
   locking the door if the valid key fob is not found by the normal request;
   locking the door if the valid key fob is not found by the wide area request; and
   providing a warning and not locking the door if the valid key fob is found by one of the normal request and the wide area request.

2. The method according to claim 1, wherein searching an area surrounding the vehicle for a valid key fob by employing the control unit to transmit a signal outside the vehicle further comprises providing a low frequency field around the door.

3. The method according to claim 2, further comprising:
   allowing the door to unlock when the key fob enters the low frequency field.

4. The method according to claim 1 further comprising activating a system override by at least one of a signal from an interior sensor, a signal from a key fob, a signal from a manual lock mechanism, and a signal from a low battery sensor.

5. The method according to claim 1, wherein the warning is an audible warning.

6. The method according to claim 5, wherein the audible warning is selected from the group consisting of a voice warning, a siren, a horn, a ringtone, and a music clip.

7. The method according to claim 1, wherein the warning is a visual warning.

8. The method according to claim 7, wherein the visual warning is selected from a flashing of exterior lights, a flashing of interior lights, a text message on the key fob, a text message on a PDA, a text message on a cell phone, and a blinking light on the key fob.

9. A method of unlocking a door of a vehicle having a keyless entry, the method comprising:
   detecting if the door is locked by utilizing a control unit within the vehicle;
   attempting to enter the door by pulling a door handle of the door a preset number of times;
   determining that a valid key fob does not exist outside the vehicle by transmitting, from the control unit via an antenna, a low frequency field immediately next to the vehicle, outside the vehicle;
   sending a wide area field within an interior of the vehicle, from the control unit via an antenna to locate the valid key fob if the valid key fob is not outside the vehicle; and
   unlocking the door if the valid key fob is detected inside the interior of the vehicle by the wide area field and said door handle is pulled said preset number of times.

10. The method according to claim 9 further providing activating an alarm system if the valid key fob is not found.

11. The method according to claim 10 further comprising sending an alarm notice if the valid key fob is not found.

12. The method according to claim 10, wherein the alarm system comprises a warning selected from the group consisting essentially of a voice warning, a siren, a horn, a ringtone, and a music clip.

13. The method according to claim 9, wherein the preset number of times is two or more.

14. The method according to claim 1, further comprising:
   disabling locking of the door by the control unit by communicating a low battery signal from the key fob to the control unit.

* * * * *